(No Model.)

S. E. BAUDER.
HITCHING STRAP FASTENER.

No. 386,682. Patented July 24, 1888.

WITNESSES
N. S. Amstutz
Geo. W. King

Silas E. Bauder INVENTOR
Liggett & Liggett
Attorney

N. PETERS, Photo-Lithographer, Washington, D. C.

United States Patent Office.

SILAS E. BAUDER, OF CLEVELAND, OHIO.

HITCHING-STRAP FASTENER.

SPECIFICATION forming part of Letters Patent No. 386,682, dated July 24, 1888.

Application filed October 24, 1887. Serial No. 253,226. (No model.)

*To all whom it may concern:*

Be it known that I, SILAS E. BAUDER, of Cleveland, in the county of Cuyahoga and State of Ohio, have invented certain new and useful Improvements in Hitching-Strap Fasteners for Harness; and I do hereby declare the following to be a full, clear, and exact description of the invention, such as will enable others skilled in the art to which it pertains to make and use the same.

My invention relates to hitching-strap fasteners for harness, in which the fastener is essentially a clamp consisting of a pair of clamping or holding jaws secured to the reins by means of an elastic band, the jaws having notches or openings for inserting the free end of the hitching-strap, to the end that a cheap and convenient device is had for the purpose aforesaid.

Figure 1:
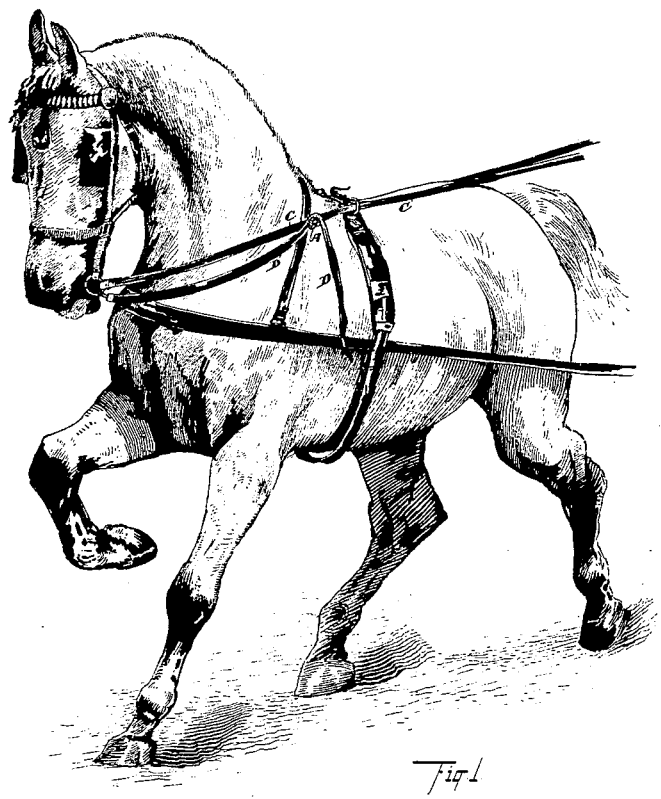
Figure 2:
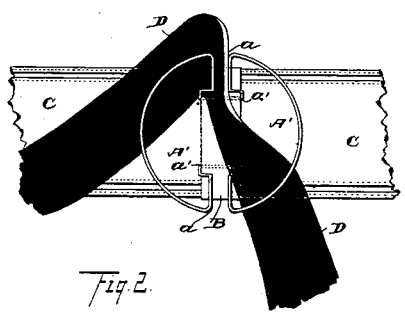
Figure 3:
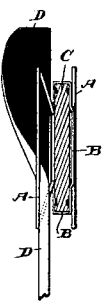
Figure 4:
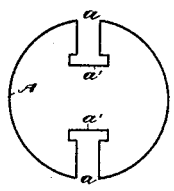

In the accompanying drawings, Figure 1 is a view in perspective. Fig. 2 is an enlarged side elevation. Fig. 3 is an end elevation, showing the rein in section. Fig. 4 is a plan of the one member or holding-jaws of the fastener.

The two holding-jaws A of the fastener are preferably alike, and preferably made of tempered steel wire, so that in effect the jaws form skeleton-frame disks, the ends of the wire being brazed or soldered together, after which the jaws are shaped approximately, as shown in Fig. 4, opposite sides being bent inward to form notches $a$, and the wire at the bottom of the notches at $a'$ forming seats for the elastic band B, the latter being usually of rubber. The holding jaws or disks A may be punched out of sheet metal, if preferred.

In assembling the parts the two holding jaws or disks A are held together flatwise, so that the notches register, and the band B is inserted first in the notches on the one side and then stretched in place in the notches on the other side, the tension of the band being sufficient to hold the jaws A snugly against each other. Jaws A are then drawn slightly apart and the rein C is inserted between the members A, the rein passing inside the rubber band. The tension of the band is sufficient to hold the fastener in position on the rein for all practical purpose of securing the hitching-strap; but as the fastener is only held by friction it can easily be slid along by hand to where it may be wanted on the rein.

For single harness the fastener is usually placed just in front of the terrets, (see Fig. 1,) for the reason that the reins are usually drawn forward through the terrets and done up with the headstall in unharnessing.

On double harness the fastener is placed just back of the terret.

In securing the hitching strap D, the latter is inserted in the upper notch, $a$, of the outside jaw, A, after which the free end of the hitching-strap may be drawn through one of the openings A' of the outside jaw, A. (See Fig. 2.) Heretofore in fastening the hitching-strap to the terret or to other parts of the harness so much slack had to be left in the hitching-strap in order that the horse might turn his head freely in the opposite direction, and more especially that the horse might lower his head, for instance, in drinking, that such slack strap presented an unsightly appearance, and persons at all fastidious in such matters usually removed the hitching-strap and carried it in the vehicle at the risk of losing the article and at the inconvenience when wanted of searching for the strap, possibly at the feet of his companion. With my improved fastener such difficulties are entirely overcome. In fastening the hitching-strap the latter may be drawn up taut with the rein, so as to be hardly noticeable and at the same time without interfering in the least with the movements of the horse's head, for it is evident that when the rein is slackened—for instance, to allow the horse to drink—the hitching-strap will also be slackened. In removing the harness the hitching-strap may be done up with the rein without detaching the strap from the fastener. Jaws A are usually plated, and tend rather to ornament than deface the harness.

I do not wish to be understood as limiting myself to the construction shown, as the device may be varied indefinitely without departing from the spirit and purpose of my invention.

What I claim is—

1. The combination, with a hitching-strap fastener consisting of an open frame or disk, substantially as described, having notches at diametrically opposite points on its periphery, of an endless strap or band for attaching the fastener to the harness, substantially as set forth.

2. The herein-described hitching-strap fastener, consisting, essentially, of a pair of frames or disks having notches therein and openings suitable for receiving the hitching-strap, and an elastic band seated in these notches for holding the jaws yieldingly together, substantially as set forth.

3. The combination, with holding frame of disk A, of rubber band B, and rein C, substantially as set forth.

In testimony whereof I sign this specification, in the presence of two witnesses, this 10th day of September, 1887.

SILAS E. BAUDER.

Witnesses:
CHAS. H. DORER,
ALBERT E. LYNCH.